(No Model.)

H. C. HAMILTON.
MACHINE FOR REELING BARBED WIRE.

No. 464,965. Patented Dec. 15, 1891.

Witnesses.
A. Ruppert.
H. A. Daniels.

Inventor.
Henry C. Hamilton
Per
Thomas P. Simpson
Atty

UNITED STATES PATENT OFFICE.

HENRY C. HAMILTON, OF ROCK VALLEY, IOWA.

MACHINE FOR REELING BARBED WIRE.

SPECIFICATION forming part of Letters Patent No. 464,965, dated December 15, 1891.

Application filed April 8, 1891. Serial No. 388,108. (No model.)

*To all whom it may concern:*

Be it known that I, HENRY C. HAMILTON, a citizen of the United States, residing at Rock Valley, in the county of Sioux and State of Iowa, have invented certain new and useful Improvements in Machines for Reeling Barbed Wire; and I do hereby declare the following to be a full, clear, and exact description of the invention, such as will enable others skilled in the art to which it appertains to make and use the same.

The invention consists in certain improvements in machines for paying out and reeling barbed wire, as hereinafter described and claimed.

Figure 1:
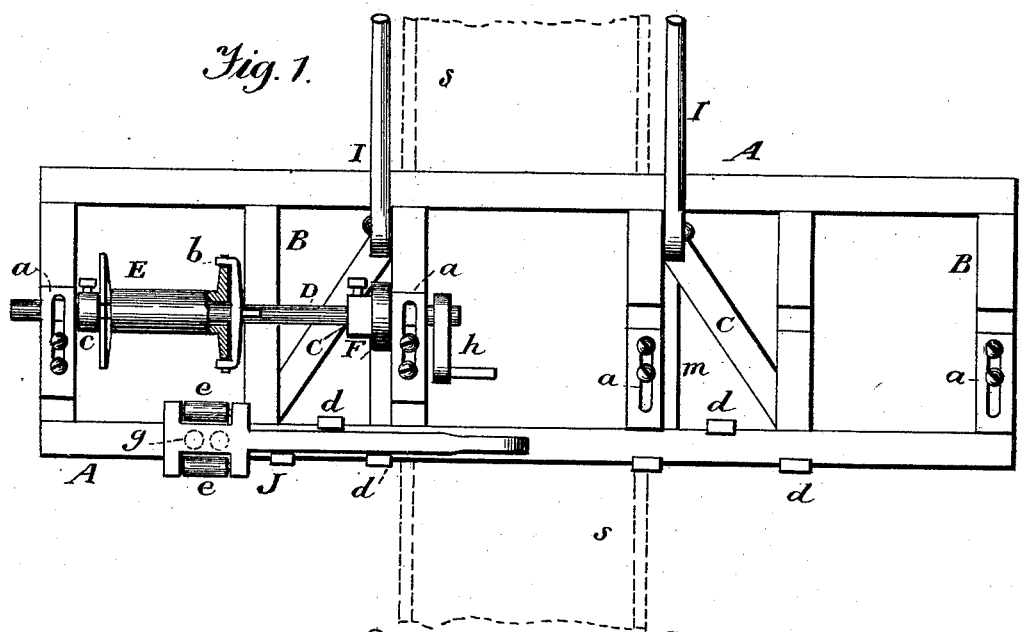
Figure 2:
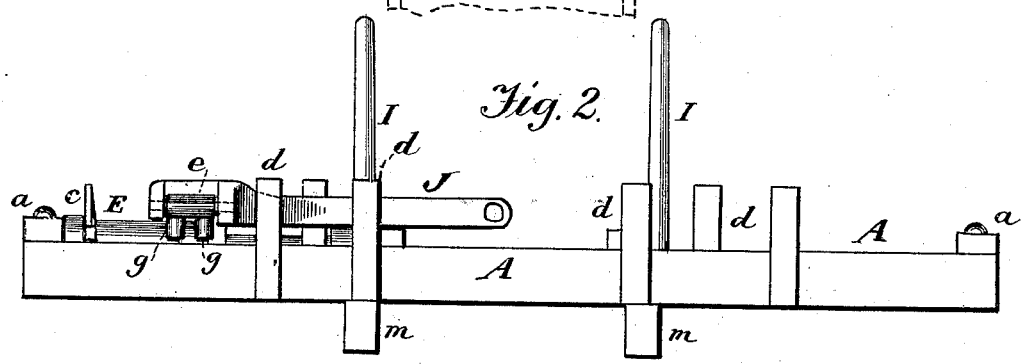
Figure 3:
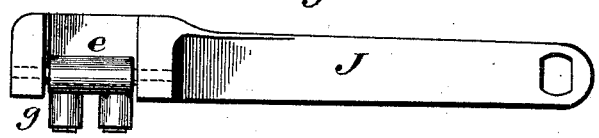
Figure 4:
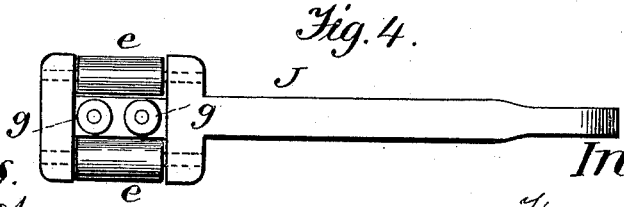

In the accompanying drawings, Figure 1 represents a plan view of a machine for reeling wire provided with my improvements. Fig. 2 is a front view of the same. Fig. 3 is a side view of a movable wire-guide. Fig. 4 is an inverted plan view of the guide.

A designates an oblong rectangular frame provided with cross-bars B and diagonal braces C, the two ends of said frame being alike in construction, as shown.

D indicates a rotative shaft, which is removably mounted in said frame at one end thereof, said shaft being secured in its bearings by removable slotted caps $a$, secured to the frame by screws passed through the slots.

Fixed to the shaft D is a bar $b$, the ends of which are bent to connect with the notched head of a reel E, which is loosely placed on the shaft D, the latter being passed through said reel, which is secured in place by a removable collar $c$.

F indicates a brake-wheel, which is removably secured to the shaft D and rotates therewith. A hand-lever I is pivoted to the frame in position to bear on the wheel F to check the rotation of the reel E when the motion of the latter becomes too rapid.

On the front beam of the frame A is placed a traveling guide J, which is movable within the vertical guides $d$, made fast to said beam. The guide J is formed of a horizontal bar or shank having a head which carries two opposite horizontal rollers $e$, which are journaled in bearings extending laterally from said bar, and two vertical rollers $g$ on pins extending downward from said bar and located between rollers $e$. The movable guide J is loosely placed in position for the wire to pass to or from the reel between the vertical rollers $g$ and under the rollers $e$, the latter resting on the wire, which passes the rollers readily when being paid out or reeled. A rod may be connected with the guide to form a handle, by means of which the operator, standing at the inward end of the shaft D, which is provided with a crank $h$, may, while rotating said shaft, move the guide J to and fro to distribute the wire on the reel as it is wound.

The device is constructed to be placed on the top of the box of a wagon and to extend across and from the same in both directions, as seen in Fig. 1, the wagon-box being indicated in broken lines $s$. The frame A may be secured to the wagon-box by means of bolts passed through the perforated cross-bars $m$, fastened to the bottom. In either part of the frame A cross-bars are provided with similar bearings for the shaft D, and the latter may be readily taken from its position at one end of the frame and transferred with the reel and other connections to the opposite end, where the shaft may be adjusted in position to pay out or reel wire at that side of the wagon. Two brake-levers I are also provided, one being located in either part of the frame to act against the brake-wheel in either position of the shaft D.

I claim—

A wire-spooler consisting of the frame A B, having the lever I, studs $d$ $d$, and perforated cross-bars $m$ $m$, the hand-crank shaft D, having the end bent bar $b$ and collar F, the loose reel E, having a peripherally-notched head, the movable collar $c$ with set-screw, and the roller-guide J, substantially as shown and described.

I testimony whereof I have affixed my signature in the presence of two witnesses.

HENRY C. HAMILTON.

Witnesses:
   M. E. DE WOLF,
   F. M. BUNTING.